Patented Feb. 13, 1940

2,190,194

UNITED STATES PATENT OFFICE 2,190,194

CHEMICAL PULPING OF RAW CELLULOSIC MATERIAL

George A. Richter, Berlin, N. H., assignor to Brown Company, Berlin, N. H., a corporation of Maine No Drawing. Application October 28, 1936, Serial No. 108,007

7 Claims. (Cl. 92—11)

This invention relates to the pulping of wood and similar raw cellulosic materials and has for its general objective the accomplishment of an initial chemical modification of certain constituents in wood and similar raw cellulosic materials that enables the realization of cellulose pulps of improved quality when such materials are then subjected to suitable cooking or pulping treatment.

In accordance with the present invention, chipped wood, such as is ordinarily used as raw material in chemical pulping processes, is infused substantially throughout with sulphur dioxide vapor and the vapor then oxidized partly or completely in situ in the wood structure to sulphuric acid, as I have found that sulphuric acid thus formed in the wood structure not only profoundly modifies the pentosan content of the wood so as to render such content more completely extractable in subsequent chemical pulping operations but further that such modification can be realized without sacrificing the various physical or papermaking properties in the pulps producible from the wood. Indeed, such pretreatment of the chipped wood for chemical pulping makes possible the realization of high grade pulps well adapted for both such purposes as papermaking and conversion into cellulose desrivatives and having lower pentosan content, higher alpha cellulose content, and lower solution viscosity than pulps prepared as ordinarily by the usual chemical pulping processes.

In carrying out the pretreatment of the present invention, the wood chips may be placed in a suitable acid-resistant vessel and sulphur dioxide vapors introduced into the vessel to cause the desired infusion of the wood structure substantially throughout with such vapors; or the sulphur dioxide vapors may be formed in the vessel by introducing thereinto liquid sulphur dioxide or strong sulphurous acid solution tending under the existing temperature and pressure conditions to flash practically entirely into vapors and to diffuse rapidly into and throughout the wood structure. The sulphur dioxide in the wood structure is then at least partly oxidized to sulphuric acid, as by circulating air, oxygen, ozone, or nitrogen peroxide through the chipped wood mass. Thus, warm air tends to oxidize the sulphur dioxide to a substantial extent to sulphuric acid, the moisture present in the wood and the woody constituents fostering the oxidizing reaction. If it is desired to oxidize most or substantially all of the sulphur dioxide in situ in the wood structure to sulphuric acid, it is necessary to employ gases of a more powerful oxidizing nature than air, such as ozone or nitrogen peroxide. In some instances, it may be desirable to steam the chips during the oxidizing reaction so as to enhance the rate of oxidation of the sulphur dioxide in situ in the wood structure to sulphuric acid. The sulphuric-acid-containing chipped wood mass is then aged or stored at the desired temperature for a sufficient period of time to permit its relatively low sulphuric acid content to react appreciably upon and modify more especially the pentosan constituents of the wood and thus to render them more easily and completely extractable during the subsequent chemical pulping operation. The temperature and time of aging may vary, depending upon the extent to which it is desired to modify the pentosans and other wood constituents. For instance, the aging and simultaneous oxidation of the SO$_2$ content of the chips may take place at temperatures ranging from, say, 10° to 100° C. and over a period of, say, one to twenty-four hours. It is generally undesirable to age the chips at temperatures higher than about 100° C., as sulphuric acid tends to modify the ligneous constituents of the wood and the modification of such ligneous constituents at temperatures higher than about 100° C. is such as to make more difficult the desired pulping or delignification of the wood during the subsequent chemical pulping operation. As an illustration, it might be noted that the sulphur-dioxide-permeated chips may be exposed to air, either stationary or circulating, at about room temperature (20° C.) for a period of about twenty-four hours or exposed to air at a temperature of about 50° to 60° C. for about eight to ten hours, under which conditions a substantial fraction of the SO$_2$ content of the chips, for instance, about half such content, is oxidized to SO$_3$ or sulphuric acid.

The pretreated, aged chips may be pulped in various chemical pulping liquors. For instance, the chips may be cooked or digested in an acid sulphite liquor containing about 1% combined and about 5% free SO$_2$. The cooking or digestion may be carried on for a period of about eight to ten hours at a maximum temperature of about 150° C., which temperature may be gradually developed during the first two hours of cooking and substantially maintained during the rest of the cooking period. The wood pulp produced by such cooking is not only of distinctly lower pentosan content and lower solution viscosity than the usual sulphite pulps but has good strength and tear resistance. It is also easily bleachable to whiteness and is hence admirably adapted for both papermaking and conversion into various cellulose derivatives. It is, of course, possible to use acid sulphite cooking liquors of various compositions and under various conditions in pulping the pretreated, aged chips; and the base of the acid sulphite cooking liquor may be calcium, sodium, ammonium, or their equivalents.

The pretreated, aged chips also lend themselves to pulping in soda and kraft cooking liquors. Thus, the chips may be cooked or digested in either soda or kraft liquors containing active pulping chemical as caustic soda and/or sodium sulphide in the amount of about 20% to 25% (calculated as $Na_2O$ equivalent), based on the weight of dry wood. The cooking or digestion may be carried on at about 160° C. for a period of about three to four hours to produce pulp characterized not only by very high tear resistance and good strength but its relatively low pentosan content. Whereas ordinary kraft pulp produced from Northern spruce has a pentosan content of about 9%, pulp products having a pentosan content of less than 4% are producible by the process hereof in kraft and soda pulping liquors. Moreover, the pulps produced by the process hereof in alkaline cooking liquors are more reactive chemically than ordinary kraft pulp, particularly after bleaching treatment. Alkaline pulping liquors of various compositions may be used under various conditions for accomplishing the pulping of the pretreated aged chips, including alkaline pulping liquors containing sodium sulphite as well as caustic soda and/or sodium sulphide.

The pretreatment of the chips need result in the infusion of only a very small percentage of acid in the form of sulphuric acid and residual sulphurous acid throughout the wood structure in order to have a profound effect on the qualities of the pulps producible from the chipped wood. Thus, only about 1% to 3% of acid, based on the weight of dry wood, need be present throughout the chipped wood mass preparatory to resolving the mass into pulp by such cooking or pulping operations as have already been described. Before proceeding with the pulping or cooking operation, the acid content of the chipped wood mass may be largely extracted therefrom by washing, especially when the cook is to be effected in alkaline liquor. However, washing is unnecessary even in those instances when the chipped wood is to be pulped in alkaline liquor, as the acid content of the chips need be so low that but small amount of alkali is consumed in neutralizing such acid content.

When the sulphur dioxide is oxidized largely or substantially completely to sulphuric acid in situ in the structure of the wood chips, the chips may be aged or stored in the open, for instance, in the usual chip bins, as the sulphuric acid is of low volatility and tends to remain in the wood structure. Moreover, the chips containing the sulphuric acid, as produced herein, need not be dripping wet but, on the contrary, may be dry to the touch and thus lend themselves to storage without trouble or nuisance. Indeed, the chips containing the sulphuric acid, as produced herein, may be practically as dry as the original chips, that is, have a moisture content of about 30% to 50%, based on the weight of the dry wood. While sulphurous acid also modifies the wood constituents, especially the pentosans, yet the sulphuric acid, being much stronger, is far more potent in its action. It is, of course, possible to impregnate wood chips with aqueous sulphuric acid solutions, but not only is the rate of penetration of the chip bodies with such solutions much slower than with gaseous sulphur dioxide but the impregnation of the wood structure substantially throughout with such solutions involves immersion or soaking of the chips in excess solution and the problems incident to handling acid-solution-soaked chips, whereas, in accordance with the present invention, large masses of wood chips may be easily and quickly impregnated with sulphur dioxide gas and then with an oxidizing gas to form sulphuric acid in situ throughout the wood structure while maintaining the structure substantially free from excess or draining acid solution. It is possible to apply the process hereof in the production of cellulose pulp from various raw cellulosic materials even though such process has especial utility in the production of pulps from wood and has been described more particularly in this latter connection.

I claim:

1. A process of pulping raw cellulosic material, which comprises impregnating such material at a moisture content not exceeding about 50% of its dry weight substantially throughout with vaporous sulphur dioxide, further impregnating such material at a temperature not exceeding about 100° C. substantially throughout with gaseous oxidizing agent to oxidize the sulphur dioxide in situ in the structure of such material to a substantial extent to sulphuric acid, the resulting sulphuric-acid-containing material being of substantially the same dryness as the original material, and then cooking such material to the condition of pulp in chemical pulping liquor.

2. A process of pulping chipped wood, which comprises impregnating the chipped wood structure at a moisture content not exceeding about 50% of its dry weight substantially throughout with vaporous sulphur dioxide, further impregnating the chipped wood structure at a temperature not exceeding about 100° C. substantially throughout with gaseous oxidizing agent to oxidize the sulphur dioxide in situ in such structure to a substantial extent to sulphuric acid, the resulting sulphuric-acid-containing chipped wood being of substantially the same dryness as the original wood, causing the resulting sulphuric acid to act upon the wood constituents at such temperature, and then cooking the chipped wood to the condition of pulp in chemical pulping liquor.

3. A process of pulping chipped wood, which comprises impregnating the chipped wood structure at a moisture content not exceeding about 50% of its dry weight substantially throughout with vaporous sulphur dioxide, further impregnating the chipped wood structure at a temperature not exceeding about 100° C. substantially throughout with gaseous oxidizing agent to oxidize the sulphur dioxide in situ in such structure to a substantial extent to sulphuric acid, the resulting sulphuric-acid-containing chipped wood being of substantially the same dryness as the original wood, causing the resulting sulphuric acid to act upon the wood constituents at such temperature, and then cooking the chipped wood in acid sulphite liquor until its pulping has been effected.

4. A process of pulping chipped wood, which comprises impregnating the chipped wood structure at a moisture content not exceeding about 50% of its dry weight substantially throughout with vaporous sulphur dioxide, further impregnating the chipped wood structure at a temperature not exceeding about 100° C. substantially throughout with gaseous oxidizing agent to oxidize the sulphur dioxide in situ in such structure to a substantial extent to sulphuric acid, the resulting sulphuric-acid-containing chipped wood being of substantially the same dryness as the original wood, causing the resulting sulphuric acid to act upon the wood constituents at such temperature, and then cooking the chipped wood in alkaline liquor until its pulping has been effected.

5. A process of pulping raw cellulosic material, which comprises impregnating such material at a moisture content not exceeding about 50% of its dry weight substantially throughout with vaporous sulphur dioxide, aging the impregnated material for a sufficient period in the presence of air at a temperature not exceeding about 100° C. to oxidize a substantial portion of the sulphur dioxide in situ in the structure of such material to sulphuric acid, the resulting sulphuric-acid-containing material being of substantially the same dryness as the original material, and then cooking such material to the condition of pulp in chemical pulping liquor.

6. A process of pulping chipped wood and other raw cellulosic material, which comprises impregnating such material at a moisture content not exceeding about 50% of its dry weight substantially throughout with vaporous sulphur dioxide, further impregnating such material substantially throughout with ozone and thereby oxidizing the sulphur dioxide in situ in the structure of such material to a substantial extent to sulphuric acid, the resulting sulphuric-acid-containing material being of substantially the same dryness as the original material, and then cooking such material to the condition of pulp in chemical pulping liquor.

7. A process of pulping chipped wood and other raw cellulosic material, which comprises impregnating such material at a moisture content not exceeding about 50% of its dry weight substantially throughout with vaporous sulphur dioxide, further impregnating such material substantially throughout with nitrogen peroxide and thereby oxidizing the sulphur dioxide in situ in the structure of such material to a substantial extent to sulphuric acid, the resulting sulphuric-acid-containing material being of substantially the same dryness as the original material, and then cooking such material to the condition of pulp in chemical pulping liquor.

GEORGE A. RICHTER.